United States Patent
Schumacher et al.

(10) Patent No.: US 6,349,275 B1
(45) Date of Patent: Feb. 19, 2002

(54) MULTIPLE CONCURRENT LANGUAGE SUPPORT SYSTEM FOR ELECTRONIC CATALOGUE USING A CONCEPT BASED KNOWLEDGE REPRESENTATION

(75) Inventors: John F. Schumacher; Tomi Magome, both of White Plains; Steffen Michael Fohn, Poughquag, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/976,986

(22) Filed: Nov. 24, 1997

(51) Int. Cl.$^7$ .......................... G06F 17/20; G06F 17/30
(52) U.S. Cl. ................... 704/8; 704/1; 707/103
(58) Field of Search .................. 704/1, 8–10; 707/100, 707/101, 102, 103, 536; 706/45; 705/26–29

(56) References Cited

U.S. PATENT DOCUMENTS

| | | | |
|---|---|---|---|
| 4,365,315 A | | 12/1982 | Jamnik ........................ 704/8 |
| 4,566,078 A | | 1/1986 | Crabtree ..................... 704/8 |
| 4,866,755 A | | 9/1989 | Hashimoto ................. 379/80 |
| 5,301,109 A | | 4/1994 | Lander et al. ............... 704/9 |
| 5,361,350 A | * | 11/1994 | Conner et al. ............. 707/103 |
| 5,375,164 A | | 12/1994 | Jennings ................. 379/88.05 |
| 5,446,885 A | * | 8/1995 | Moore et al. ............... 707/103 |
| 5,535,120 A | * | 7/1996 | Chong .......................... 704/2 |
| 5,560,005 A | * | 9/1996 | Hoover et al. .............. 707/100 |
| 5,652,884 A | * | 7/1997 | Palevich ..................... 707/100 |
| 5,687,366 A | * | 11/1997 | Harvey, III et al. ........ 707/100 |
| 5,740,425 A | * | 4/1998 | Povilus ....................... 705/28 |
| 5,897,639 A | * | 4/1999 | Greef et al. ................ 707/103 |
| 5,907,326 A | * | 5/1999 | Atkin et al. ................ 345/334 |
| 5,953,726 A | * | 9/1999 | Carter et al. ............... 707/103 |

OTHER PUBLICATIONS

Boch, Grady, "Object Orirnted Analysis and Design with Applications" 2nd Edition. Benjamin/Cummings Pub. 1994.
Rumbaugh, J. "Object Oriented Modling and Design" Prentise Hall 1991.
Coad, Peter Object Models: Strategies, Patterns, and Applications Prentise Hall 1995.

* cited by examiner

*Primary Examiner*—Patrick N. Edouard
(74) *Attorney, Agent, or Firm*—Steven J. Meyers

(57) ABSTRACT

The current invention represents a system which facilitates the use of electronic catalogs in a manner that is presentational and language neutral. This is accomplished by managing and manipulating the system at the level of conceptual entities and the separation of these conceptual entities presentational form, from their manipulation form.

34 Claims, 7 Drawing Sheets

The symbols and translations for a Television concept

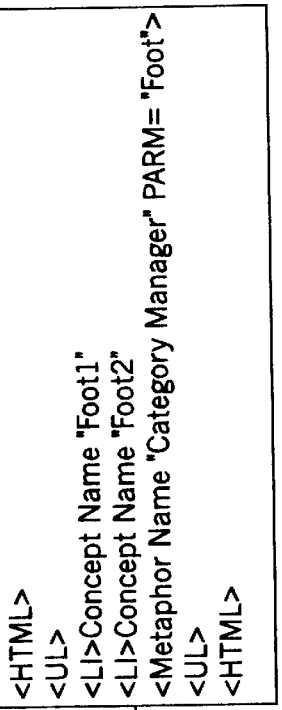
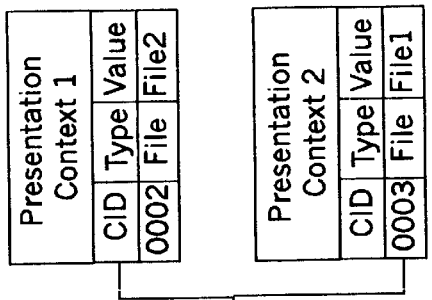
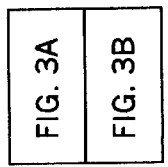
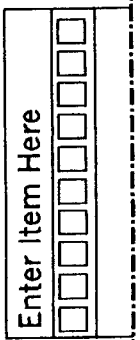
FIG. 3A
FIG. 3

A sample application of the processor controller

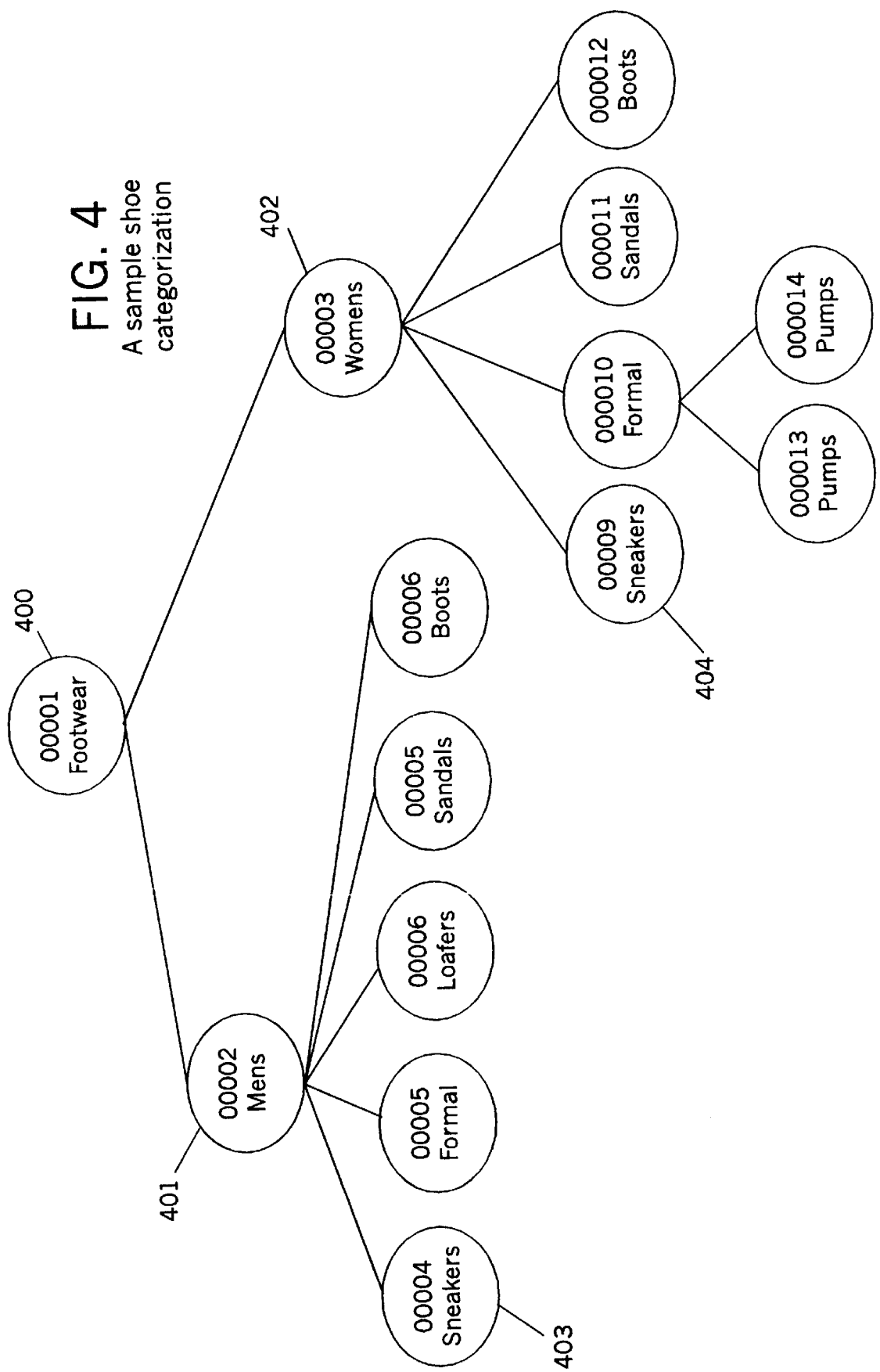

5. For the concept determine the types and presentation symbol for the present presentation context. This maybe a static hookup into the knowledge representation or may require a conversion or calculation using user defined routines based on the type. The type is scoped to the presentation contex.

| German Presentation Symbol Dictionary | | |
|---|---|---|
| Object ID | Type | Presentation String |
| 00001 | UNICODE String | Schuhe |
| 00002 | UNICODE String | Tom Schuhe |
| 00003 | UNICODE String | Lauf Scchuhe |
| 00004 | UNICODE String | Latschen |

| US English Presentation Symbol Dictionary | | |
|---|---|---|
| Object ID | Type | Presentation String |
| 00001 | UNICODE String | Shoes |
| 00002 | UNICODE String | Sneakers |
| 00003 | UNICODE String | Running Shoes |
| 00004 | UNICODE String | Sandals |

FIG. 5B
A sample category search

MULTIPLE CONCURRENT LANGUAGE SUPPORT SYSTEM FOR ELECTRONIC CATALOGUE USING A CONCEPT BASED KNOWLEDGE REPRESENTATION

FIELD OF INVENTION

The current invention represents a system which facilitates the use of electronic catalogs in a manner that is presentational and language neutral. This is accomplished by managing and manipulating the system at the level of conceptual entities or units and the separation their presentational form, from their manipulation form.

BACKGROUND ART

As business activities are becoming increasingly more international, companies are required, in each country in which a company conducts business, to operate in several different languages. The diversity of these cultures produces a challenge for information systems. Each culture wants the software and data it produces to support the local conventions and cultures. This means that software must be translated for each of these cultures. The cultures can differ in terms of script (written languages used), languages, meaning of pictures and images, currency conventions, address and telephone number conventions, data and time conventions, units of measures commonly used, and many other aspects of the information system.

Typically, the term globalization is used to refer to the process of enabling software to support multiple languages. Globalization involves removing all cultural biased conventions from the software and placing them into external resource files so that the software can more quickly be adapted to the conventions and language of a particular culture. The term localization is used to refer to the process of providing a particular cultural binding of the software. The localization process involves translating the strings, images, and other elements of the system to a form that matches the local conventions of a particular culture. In the context of this system, translation can be substituting words, phrases, images, sound or another form of multi-media content to those which are more familiar or correct for a particular locale.

Further, the cost of translating systems and information can be quite expensive. This cost is particularly high if the information system changes frequently. Each change must be made for all the locales. If a system can not manage the effects of change efficiently, increased costs are the result as unneeded translations are required.

Today, globalization systems are limited in that their operation is restricted to the string level where each string in the system is placed in a resource file and then translated. These systems are further restricted to loading no more than one resource file at a time, consequently, they are unable to support more than a single locale at any particular moment in time.

The instant inventive system utilizes a hierarchical knowledge representation in order to more efficiently support the translation and management of multiple locales. Utilizing this type of knowledge representation provides two key advantages. The first is a greater ability to differentiate semantically different symbols within the system. The second, is the ability to reutilize the translation of these symbols in the knowledge representation scheme with concurrent local support.

This problem is particularly acute for electronic catalogs deployed in the global scope of the Internet where the need for concurrent language and presentation support for multiple locales is evident.

SUMMARY OF INVENTION

This instant computer software system facilitates the use of electronic catalogs in a manner that is presentational and language neutral. This is accomplished by managing and manipulating the system at the level of conceptual entities or units and the separation of these conceptual entities presentational form, from their manipulation form.

BRIEF DESCRIPTION OF THE DRAWINGS

FIGS. 3A and 3B contain a diagram of a sample application of the preprocessor controller.

FIG. 4 is a diagram of a sample shoe categorization.

DISCRIPTION OF INVENTION

Figure 1:
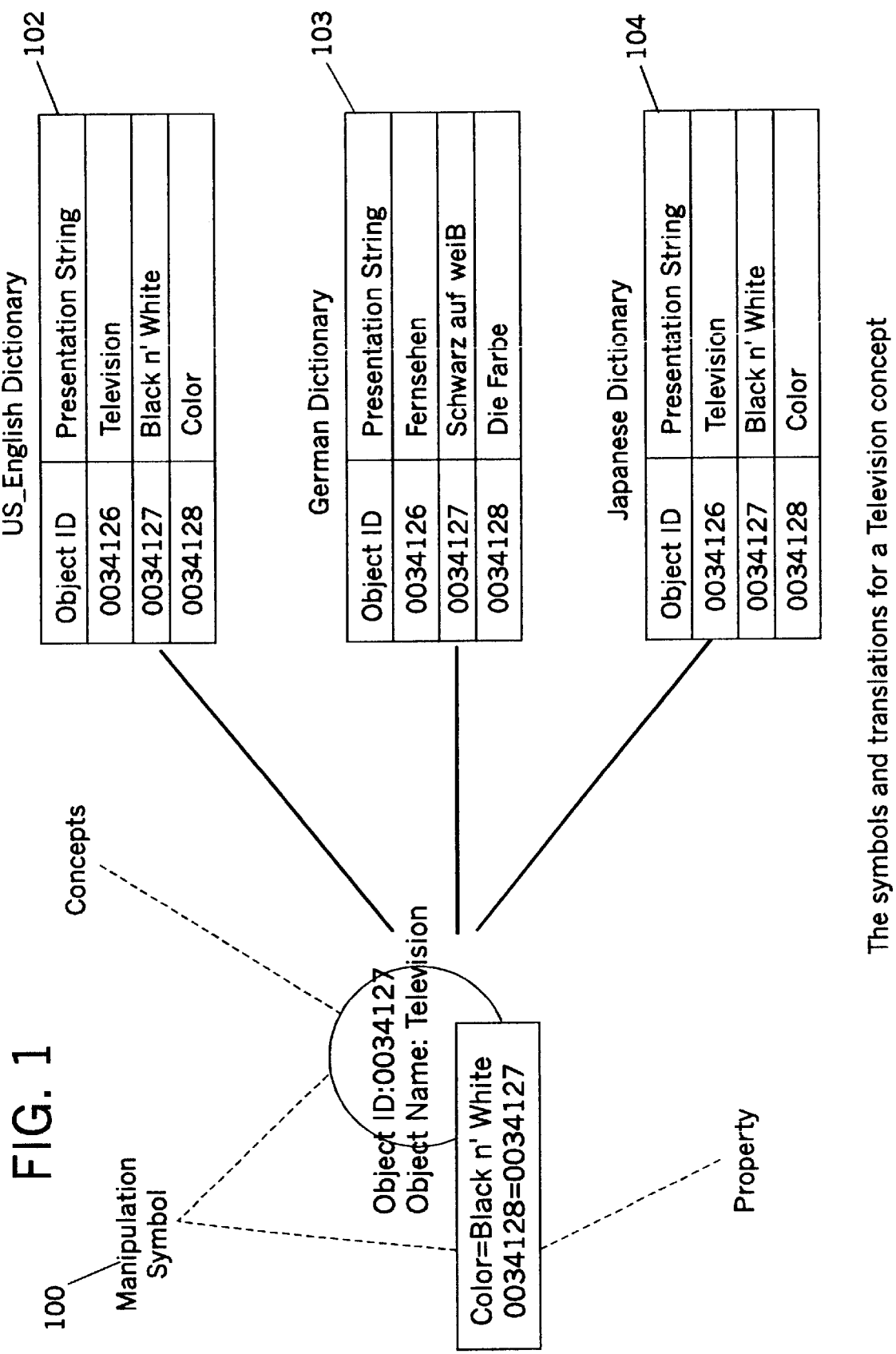
FIG. 1 is a diagram of symbols and translations for a television concept.

Every entity (e.g. data object) in the system has a pointer to a list of resource objects. These entities represent the distinct conceptual units in the system. The system manages information as conceptual units or idioms instead of as text strings, words, or some arbitrary unit. The resource objects represent a set of presentation symbols that are presented to the user as the visual, auditory, or other sensory output for the entity. The resources are grouped into locale contexts. The locale context represents a collection of resources which share a common language, set of local cultural conventions, or common set of terminology's and presentation units. These locale contexts are grouped to make indexing into the presentation symbols within a particular locale context more efficient.

The heart of our system is the utilization of information management and modeling techniques as a method to facilitate the process of translation and localization of information and a system that adds on to these systems features the facilitation of multi-locale support. A discussion of the use of the Knowledge Representation for the management of information, on management of multi-lingual/multiple presentation to form catalog information follows.

Hierarchical Knowledge Representation:

The instant system utilizes a hierarchical knowledge representation. Further, this system utilizes inheritance hierarchies similar to object oriented systems. In these types of systems an entity or concept can be described or defined as an extension of another concept or entity in the system. For example the following is a simple example of this type of hierarchical knowledge representation.

A typical hierarchical knowledge representation system supports the construction and manipulation of a conceptual model. Such a model includes descriptions of concepts or frames, such as a company, together with their instances, such as IBM or Compaq. Concepts are organized into a taxonomy based on generalization relationships, so that more general concepts are higher in the taxonomy than their specialization's, e.g., company subsumes computer company, which subsumes software company, and so on. Concepts and their instances are also described in terms of their properties. For example, company might have an employee property whose values are constrained to be of type human. Properties can be "inherited" from a concept to its subconcepts as well as its instances, so that computer company, software company, and IBM would all have an employee property too.

Such systems separate semantically different concepts. This allows a more precise translation process. Semantic concepts can be very different across cultures. For example, the single word "Rice" in English has many different representations in Japanese cultures.

Another example involves the word "Size". In a typical product catalog the word size is an extremely heavily used word concept. However, the meaning of the word size can be very different depending on what type of product is being described. Size is very different when describing shoes than describing memory within a computer. By utilizing the hierarchical knowledge representation these strings are cleanly separated and translation can be facilitated to those most appropriate terms.

Further, a hierarchical knowledge representation facilitates the reuse of semantically similar symbols across a knowledge space. For example, if the word "Size" is used in the same semantical way within several different products descriptions, the translation of the word size only needs to occur once.

The instant system uses a frame based semantic knowledge representative system in order to minimize the amount of translation that must be done. Semantic symbols are only represented in the system a single time. Then the symbol and its translation are inherited by other concepts that need them. For example, a Japanese translation for shoe might be inherited as the translation for dress shoe and casual shoe, in the absence of more specific translations. This is different than the string substitution method used in some other systems. Two strings which are syntactically similar may be semantically different. This underlying semantic difference produces a problem during translation since the strings are translated the same way for each language and can produce semantic inconsistencies.

The knowledge representation has the feature that symbols are separated by their semantics and that symbols with a common semantic point to a common symbol. This provides an advantage in translation and the management of translation in that each symbol only needs to be translated one time.

Further, even for systems that allow the reuse of presentation symbols, such as resource files, our system provides a means of logically organizing the presentational symbols. Other systems utilizing facilities such as resource files allow the user to reutilize strings many places within the system but provide no support to help manage these resource strings and presentation symbols. Therefore, maintenance and updates of the resources is a difficult task.

While many aspects of a given model may be application specific, others are rather general. A hierarchical knowledge representation scheme such as we have described is well suited for building models which include pre-existing components., e.g. for units of measure, can be built once, translated once per target language, and reused across many applications.

Conceptual Units

A conceptual unit is a complete idea or idiom and has a context. For example, a conceptual unit "size" may exist in a consumer catalog. The word "size" within this electronic catalog may be used to refer to the size of a shirt and also to the size of a hard drive within this same system. However the two uses of size are unique and must be represented by different and unique concepts or manipulation symbols within our system (e.g. Shirt Size and Disk Size) even though they may both represent themselves to the user as the word "Size" when presented to the user of the system in English. They are unique because the measure and meaning of the word size when it refers to a shirt is different than the measure and meaning of the word size when it refers to a hard drive. Similarly, if we have two different computers both with hard drives, they both utilize the same conceptual unit of size for those hard drives. Therefore, the conceptual unit of size is common for both, even though the conceptual unit is used by two different entities within the catalog. Conceptual units exist as either concepts, concept properties, or concept property values in the knowledge representation. All of these conceptual units are subject to translation. Consider the following:

Concept RedShoe extends Shoe
{
    Color=red;
{

This example introduces a concept named RedShoe which is derived from another concept named Shoe (not shown). It has a property color whose value is red. Concepts represent new types within the instant system while properties are used to describe the characteristics of concepts.

A "concept" is an object, idea, or thing that we can talk about or think about within a particular application domain. When we describe an application the concepts are typically the nouns in the conversation. Concepts can be physical objects in the universe, imaginary objects, data structures within a computer system, or ideas. They are similar to the notion of classes within an object-oriented system (Booch 1994, Rumbugh, et al. 1991, Jacobson, et al. 1992 and Coad, 1995). "Properties" are scoped characteristics or attributes of a concept. Concepts and properties are both conceptual units and determining whether a conceptual unit is either a concept or a property is a knowledge engineering activity.

Computers are systems that contain and manipulate symbols. Conceptual units are represented and manipulated as symbols within an instant system. Symbols are abstractions that represent conceptual units within the universe. The instant system differentiates two types of symbols: (1) Manipulation Symbols and (2) Presentation Symbols.

Manipulation Symbols

This is the internal representation symbol that is primarily used for the computer for manipulation and storage retrieval. This symbol is not generally used for presentation purposes. The manipulation symbol may in fact exist in two forms. An internal object id form that is computer efficient but is not generally human readable and an object name, a form that is human readable but still a manipulation symbol that is generally not used for end-user presentations of the symbol. The object name form is "Semantic Sugar" for the object id to help in de-bugging the system and working with the system.

Presentation Symbols

These are symbols that are presented to the user to facilitate their interaction with the system. This symbol may be a string of characters, an image, animation, or any other presentational form of the symbol.

For each conceptual unit within the system there is a single manipulation symbol. This symbol may be associated with one or more presentation symbols. A named group of presentation symbols make up a locale or locale context . These locale contexts may be based on an internationalization standard such as XPG4 or the POSIX locales or it may correspond to a user defined context. For Example, user defined locales representing two translations or sets of presentation symbols for US English, would be considered locale context. One could utilize "domain expert" terminology while the other utilizes novice terminology. For example conceptual unit describing laptop displays may have the presentation string "Display Resolution" in an US English Expert locale context, but utilize the presentation string "Screen Clarity" in a U.S. English novice locale context. These locales might also have the values "1600× 1200" as a presentation string for a conceptual unit that represents one of the values in the U.S. English Expert locale context and might utilize the presentation string "Extremely Clear" in the U.S. novice locale context. Given the run-time support for multiple concurrent locales, and the notion of a conceptual unit, different translations choices can be made on a fine-grained basis (e.g.., concept by concept) during the course of a single user session.

The separation of manipulation symbols from presentational symbols and the use of locales is a common practice in systems that support multiple languages. However, in most traditional systems these bindings from manipulation sources to presentation symbols are statistically defined. A system loads one resource file at a time and runs in the locale supported by the locale. In our system, the design supports the concurrent use of multiple locales at the same run time. Therefore, a user can have presented to them with respect to information in multiple locales at the same time. In this patent application the concurrence within the system is important as part of the facilitation of translation.

Note that in FIG. 1 the left-hand side represents the manipulation symbols 100 (the human non-readable ids in addition to the human read readable object names-see the Symbols section) while the right-handside 102, 103, 104 represents the locale specific presentation symbols translated from the corresponding human understandable manipulation symbols. Further, most traditional systems do not break translation up into "conceptual" units. Instead, most globalization systems work at the string or resource level where each translated string in the system is placed in a resource file.

Concepts in the instant system are types. Further, the information within a concept is typed. For example, its "name" may be of type string with a particular value such as "my Concept" More over a concept may have properties such as "my Size" of type Size, with values, small, medium and large.

The Process: Client and Server

The system consists of two logical pieces of software; the client software and the server software. The client software is the piece of software that is responsible for interacting with the user. It renders information to be presented to the user and receives the interaction requests from the user.

The server is responsible for processing the requests from the user and returning information to be rendered by the client. The client and server can be co-located on the same machine and even within the same software process or can be distributed across a multitude of machines.

Locale/Locale Context Negotiation

Figure 2:
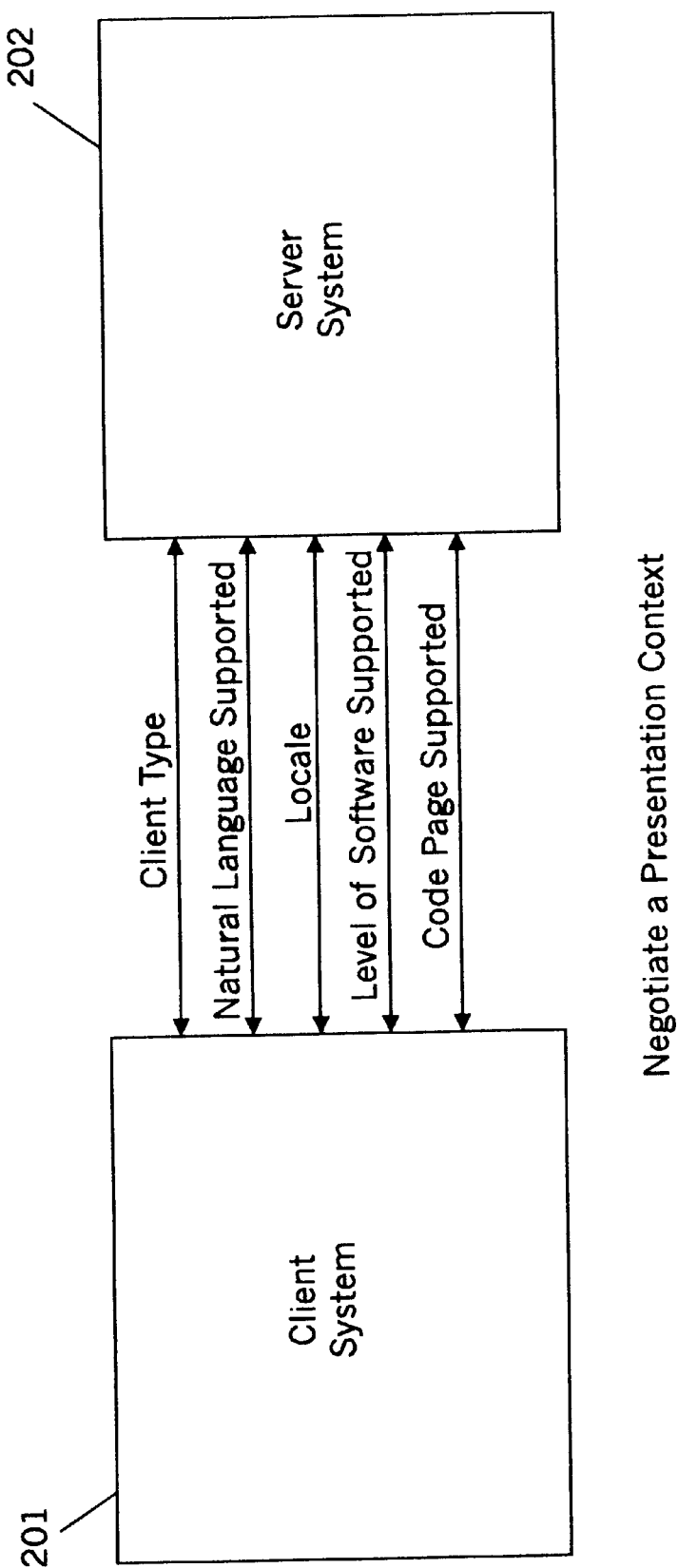
FIG. 2 is a diagram to negotiate a presentation concept.

The first step in the process is to negotiate some locale/locale context between the client and the server software systems. FIG. 2 illustrates the prior art that exists for means of negotiating a locale between a client 201 and server 202 software system. For example, HTTP 1.1 specifies a protocol interchange for determining HTML language levels support, HTTP protocol level support, preferred natural language, and object forms that are preferred (e.g. GIF vs. JPEG).

The software systems must negotiate to create locale/locale context in which the server can operate. The scope and duration of this context can vary depending on the needs of the software system. It can exist for the duration of an interaction between the client and the server systems or can be at a very fine level of granularity for each individual request to the server system.

Metaphor controller: Within the software system requests on the server are processed by modules or software components called metaphor controllers. A metaphor controller is a piece of software that provides some form of catalog interaction with the client. For example, controllers exist that provide support for category navigation, parametric search, question & answer sessions with the client, and a multitude of other interactions.

The metaphor controller in the case of an HTML/HTTP session can be a CGI scripts or servelet that is invoked by the HTTP server. In the case of other software systems it may be a subroutine, subprogram, or embedded component within the system. The metaphor controller is invoked as part of the request to the server. In the case of HTML it may be named or invoked as part of the URL request to the HTTP server.

Figure 3B:
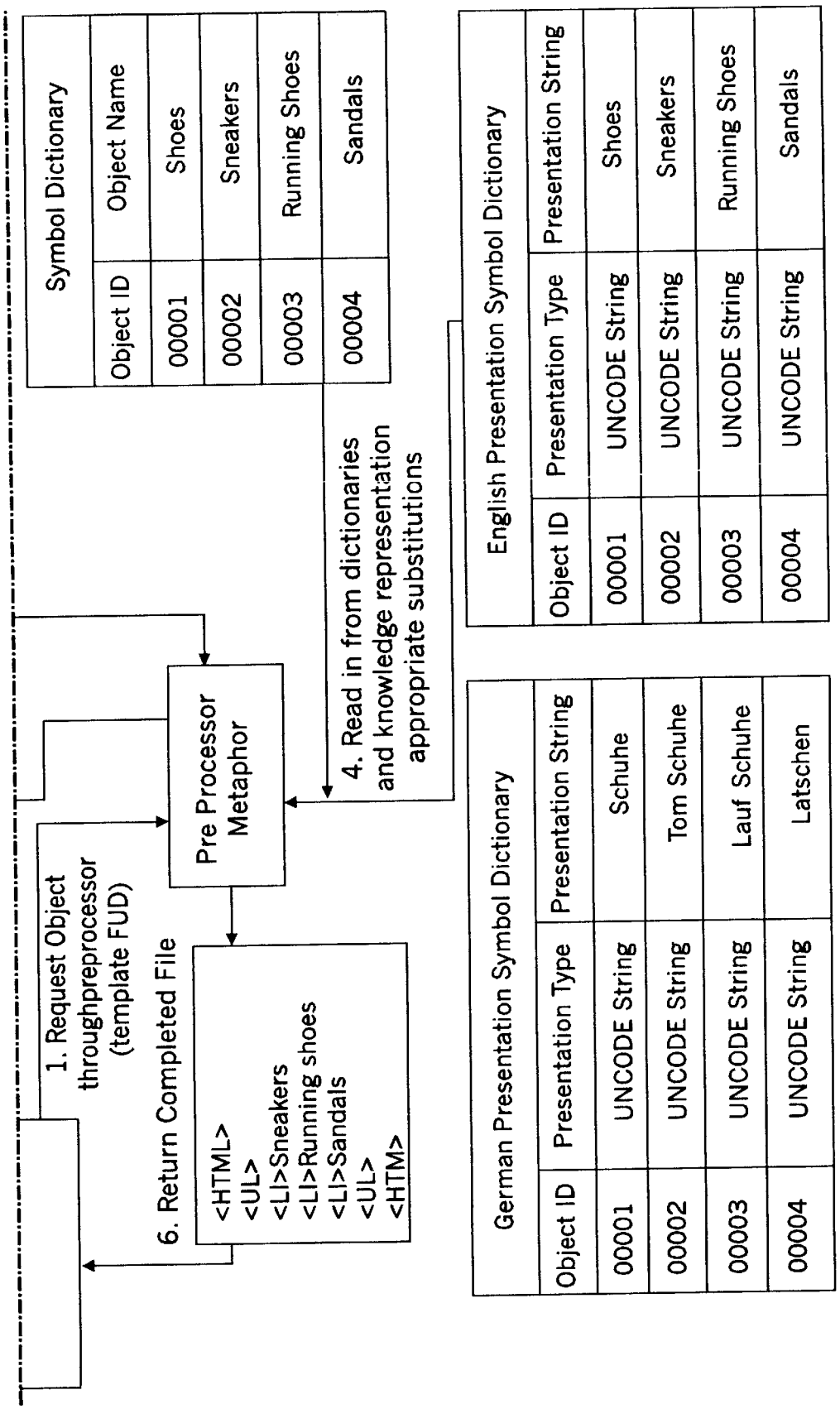

One of metaphor controllers is the metaphor preprocessors, as seen in FIG. 3. The metaphor preprocessor performs two actions:

Based on the locale/locale context of the current session with the client it determines the appropriate object files to return to the client.

In the case of HTML files or other processable types of files the preprocessor controller may scan the file and invoke other metaphor controllers, or process the file being returned to substitute manipulation symbols with the appropriate presentation symbols based on the context locale/locale of the user.

For example the following might be a template for an HTML file being returned to the user:

```
<HTML>

<UL>

<LI><A HDEF="http://some-url/campre.exe?WomensShoes"></
    CONCEPT NAME>"Women Shoes"></Concept Name=></A>

<LI><A HDEF="http://some-url/
    campre.exe?MensShoes"><CONCEPT NAME="MensS-
    hoes"></A>

</UL>

</HTML>
```

This HTML file would be preprocessed by the metaphor preprocessor. Every place that the <Concept Name=> tag is found, the associated manipulation symbol is substituted with the presentation symbol for the appropriate locale/locale context.

In a more complex form of markup that might be processed by the metaphor preprocessor there could be invocation strings for other metaphor controllers to be invoked that interact on some portion of the HTML file:

```
<HTML>

<UL>

<LI><METAPHOR NAME="CategoryManger" PARAM="Wom-
    enShoes>

<LI><METAPHOR NAME="CategoryManager" PARM="MensS-
    hoes>

</UL>

</HTML>
```

In this case the metaphor processor would involve the "Category Manager" metaphor controller to process each piece of the HTML file where the <Metaphor=> tag is located. The "Category Manager metaphor controller would complete the portion of the file at this point.

Once it has completed processing, control is returned to the metaphor preprocessor who can invoke the next controller or return the final file back to the HTTP server for return to the client. A multitude of other controllers similar to the Catagory Manager Controller could be embedded and invoked in this process.

Preprocessing HTML files and invoking objects specified within the files is prior art. This technique and technology is used by a multitude of other systems. However, our system uses this as a process for allowing files to be managed and maintained in a language neutral manner. Language elements are kept with their context within the knowledge representation. This is similar to the idea of resource files within Windows, OS/2, and many other operating systems. However, there are some differences. Resource files within these operating systems are traditionally static and are bound to the executables during program linking. In this system the information is dynamically bound based on the locale I locale context. The locale/locale context can change many times during the interchange between the server and the client. Next, there is not necessarily a one to one correspondence between a resource id and the substitution. Since the resource ids can represent metaphor controllers where very complex substitution can be done that relate to entire metaphors within our system. Resources can also reference other resources during expansion to manage cultural specific differences in the presentation. For example addresses in the United States and Japan have different fields and orders.

Further, the HTML files that are being preprocessed themselves and the information being specified within them are all managed within our knowledge representation system. Therefore, the template itself is not fixed, but a different template file may be selected based on the locale/locale context. Therefore, we may have a template file that is designed for English users and another that has a very different design that is used for German users of our system.

Category Search through the Catalog: We will use category search as one example to illustrate how the client and server utilize the knowledge representation to provide locale context information back to the client system. Category search is a common form of search by which users locate information in electronic catalogs and other systems that contain large amounts of information. FIG. 4 presents an example of a categorization that might be found in a "shoe" catalog.

There are a multitude of manners in which a category search can be presented to the client software system such as trees or drill down stacks for when we click on "Footwear" 400 we are presented with "Mens" 401 and "Womens" 402. Note that the same presentational forms of category names can exist in multiple places within our category. "Sneakers" appears under both the "Men's" 403 and the "Women's" 404 categories. However, while these two symbols have the same presentation they have different scopes and therefore are actually represented by statistically different manipulation symbols. In other cases we can have two different places in our categorization refer to the same symbol.

A category exploration metaphor can be statistically coded utilizing the method presented with the metaphor pre-processor described in the previous section. For example, static html pages that represent each view in the category could be encoded with the concepts to be expanded in order to represent the page. Another method would be to utilize a Java side client program and yet another would be to use a category metaphor controller that would fetch and render the HTML pages dynamically.

In all of these cases the interaction with the knowledge space is generally the same.

Figures 5, 5A, 5B:
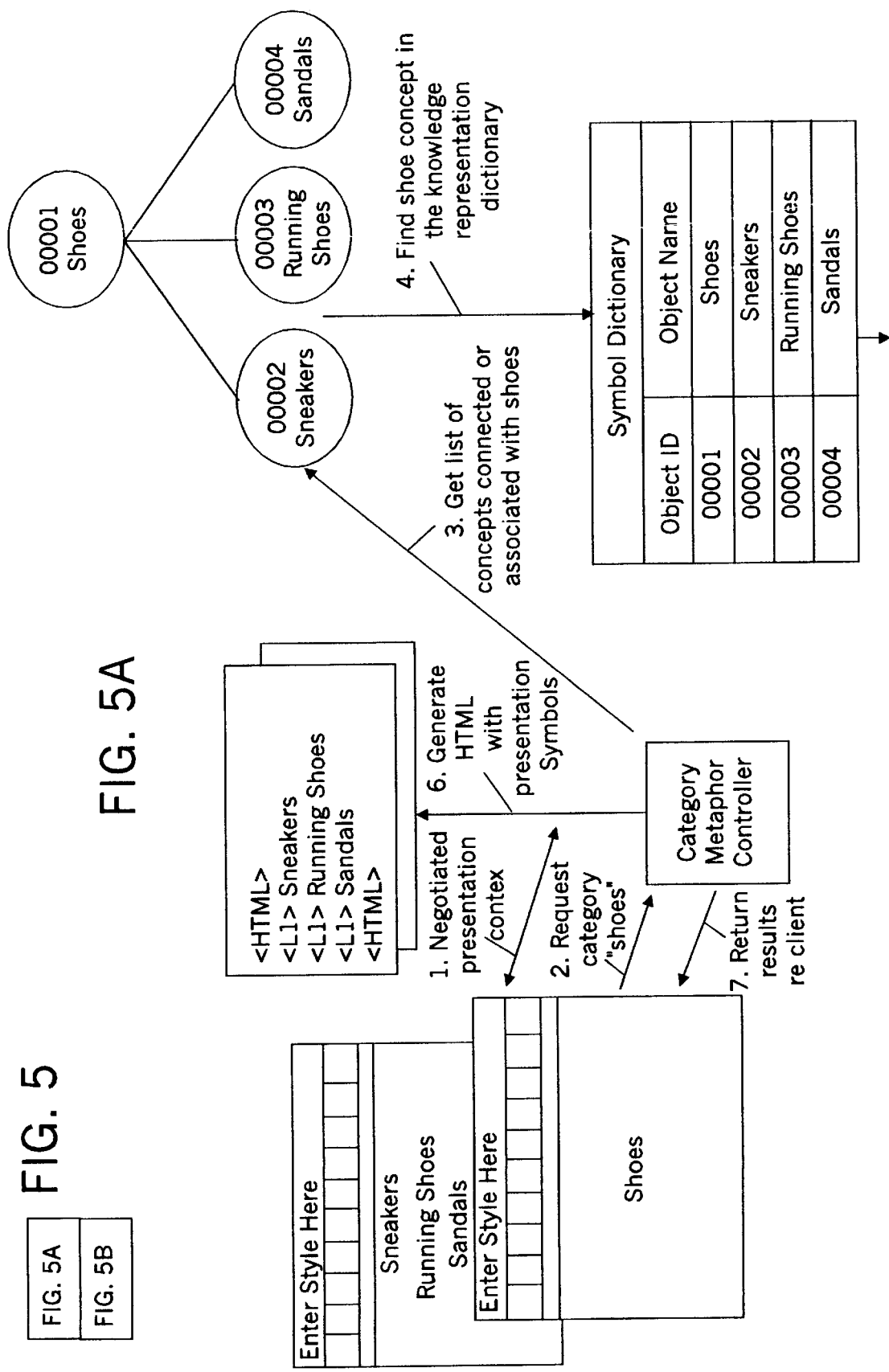
FIGS. 5A and 5B contain a diagram of a sample category search.

FIG. 5 illustrates a sample category search.

1. A locale/locale context is negotiated between the client and the server systems. The two systems interchange information about the desired locale and languages, desired code page, and representation forms that are supported.

2. The server program then receives requests from the client for searching through the categorization within the knowledge representation.

3. The category metaphor controller queries the catalog content management system for the list of concepts associated with "Shoes". Note that the catalog content management system manages the categorization information as a set of nodes and connections between nodes. These nodes and connections can be represented in a multitude of data structures including relational database tables or a hierarchical data system with pointers in memory between connected nodes.. The nodes in the knowledge representation each contain the manipulation symbols for describing and representing the category. This information may include symbols that represent a name for the category, descriptions of the category, or other properties of the category and the items that are contained within the category.

4. The system fetches the children of the categorization as described in the knowledge representation getting the manipulation symbols for the category and its properties.

5. The system then uses the locale/locale context dictionaries to "look-up" the proper presentation symbol of the each of the category or products information that are contained within the category based on the current locale/locale context. This can be a multi-dimensional map, in which the index is based on the language/locale, code-page desired, and other information within the context. The information can be statistically located within the dictionaries as is generally the case of simple string indexes for properties. However, the interaction can be more complex in some cases. For example, the servor system may store its data utilizing UNICODE strings by default. However, if the client requests the information as a set of MBCS strings the system must proceed in one of two ways. It can dynamically translate the UNICODE into the required MBCS code page strings and return them to the client. The other possibility is to have a two layered index into the dictionaries where the first level of the index finds the presentation string, and the second index finds the presentation string statistically represented in a particular code page representation. A third possibility is to have a manipulation symbol map into several representation symbol indices, one for each code page. The differences between the three is primarily a space vs. performance issue.

Further, integer and real values, typically represent units of measure or real world types within the catalog. For example sizes, weights, speeds, and lengths. It is generally not the case that numbers in a catalog do not have an associated unit of measure. Therefore, the system must detect the type of the unit of measure and provide a conversion from the stored from of the unit of measure to a form of the unit of measure that is desired based on the locale/locale context of the client system. For example, a system asking for a length in the United State might desire the measure in inches. A client system requesting the information from Great Britain or even in the United States for scientific purposes would be more likely to desire the results in centimeters or millimeters. It is not always the case that measures will be provided via conversions. Like static strings, there are cases in which units of measures are provided by a double indexed look up into the knowledge representation. For example it is unlikely the system will perform simple conversions on currencies. This is because conversion factors for currency are continually fluctuating. Consequently prices in the catalog may contain static pricing for the product in each locale. A more complex system might use a look up table for current conversion factors and have this lookup table being continually updated by some form of data stream. The important aspect of the system is that is looks into the knowledge representation for the presentational form of the manipulation symbols. It looks up in a dictionary the type and unit of measure of the presentation symbol within the desired locale/locale context. Unit of measure is a locale/locale context can have a set of user defined policy rules which are fired to form the actual presentation symbol. This can include simple look-ups into a column within a table for a predefined form of the presentation symbol, or can consist of complex conversions and calculation rules in order to dynamically create and calculate the required presentation symbol.

6. Operations against the catalog that require ordering based on magnitudes or comparisons between different symbols within the system are performed after the system has converted the manipulation symbols to presentation symbols so that the results are accurate based on the locale/locale context.

Generally, navigation through the knowledge representation is performed utilizing the manipulation symbols and not the presentation symbols. This minimizes the number of conversions and lookup that must be performed to get to a result set.

7. The results of the presentation symbols are returned to the client system and then rendered for presentation to the end user.

Parametric Search through the Catalog: In parametric search, information is retrieved based on selecting of attribute value pairs that must be in the result set or by selecting attribute/value pairs that must not be in the result set. Both the names of attributes and their values are presentational symbols and language based. The units selected in the parametic search are conceptual units that have semantics within the knowledge representation. However, by indirecting the symbols that represent both the attributes and the values, parametric search can be turned into a language neutral search mechanism. Again, like in the category based search, manipulation and selection with the system are done via a mapping to manipulation symbols rather than the presentation symbols. In the case of parametric search there can be more requirements on conversions since the attributes are typically values.

Regular Expression Search through the Catalog: A regular expression search, is a search in which information is matched against a string or word form. A common tool that uses regular expression search is the grep utility on unix systems. The most common form of search in electronic catalogs or on the internet is regular expression search. Find me all products that have the string "TV" in them.

The Instant system provides a superior form of regular expression search for a cross cultural catalog because of its separation of information into presentation context dictionaries and the use of the semantic context. Therefore, the system will not return as many erroneous results. Each dictionary exists within a locale based context. Further, dictionaries of strings are separated from dictionaries of other types. A regular expression string search can therefore use culturally sensitive dictionaries in order to perform its search and can also utilize culturally sound searching and sorting conventions within the dictionary.

In addition, the client system can optionally request that a search be done across all dictionary locales.

Further, dictionaries can reference presentational strings for a conceptual unit that may be rendered to the user as an image or a, sound file, or other media type. In this case even though the image may not actually be searched for as a string, such as "camera" the fact that a camera is depicted can be captured, searched, and returned, by utilizing the semantics and relationship within the knowledge representation.

Synonym Search: Synonym dictionaries can be used in conjunction with regular expression search within our system in order to provide even better support for searching a dictionary for the proper matches. In this case a word entered by the user is matched up against a set of synonyms within a synonym dictionary. Searches are then performed throughout the knowledge representation for all words that correspond to the synonym. The synonym can be tied directly back into the knowledge representation conceptual units therefore minimizing the amount of irrelevant searching that must be done. This is accomplished by extending the knowledge representation with lexical conceptual units and tieing them to the catalogs native conceptual units. Thus powerful searches can be performed. For example:

1. The user searches for "dogs" within the system
2. The software system looks up the concept of "dog" within the synonym dictionary. In addition to the symbol "dog" it finds symbols for "collie", "Labrador", "puppy", etc. within the dictionary.
3. The synonym dictionary has direct maps to concepts and properties in the knowledge representation that refer to any of these expanded forms of the "dog". These are returned to the user in a some optionally weighted order.
4. In addition the system can do a general dictionary search through the current locale Context string dictionary to determine if any of the synonym words for dog randomly appear within the dictionary. If an item is found, then it is returned to the user with a lower weight than concepts that directly map to the conceptual unit. The reason for the lower weight is that these words are not conceptual units referring to a dog and therefore are more likely to be random or irrelevant matches.

What is claimed is:

1. A computer based multiple concurrent language electronic catalog system comprising:

means for providing concept entities in a concept entity based hierarchical knowledge representation of symbols for the electronic catalog;

means for dividing the concept entities of the hierarchical knowledge representation of the symbols into computer readable manipulation forms of the symbols used for computer manipulation and for storage retrieval and not for end user Presentations and human readable locale specific presentation forms of the symbols with parent and child entities hierarchically linked so that the presentation forms of the symbols are translated once and inherited for end user presentation of concept entities in locale contexts wherein there is a plurality of different locale specific presentation forms associated with each manipulation form and wherein there are multiple manipulation forms associated with a locale specific presentation form when there are multiple semantically different uses of a symbol in the same locale presentation form;

means for permitting selection by users of one or more of the presentation forms for each of the manipulation forms for presenting the concept entities in a selected locale context;

means for maintaining the selected presentation form separate from the manipulation form; and means for providing a concept entity based on navigating through the electronic catalog using the manipulation form of the concept whereby translations of symbols are shared while semantic differences in use of symbols in a particular locale are resolved.

2. The computer based multiple concurrent language electronic catalog system of claim 1 wherein said locale specific presentation forms each comprise said conceptual entities presented in a different language.

3. The computer based multiple concurrent language electronic catalog system of claim 1 wherein said locale specific presentation forms each comprise said conceptual entities presented in a different form of the same language.

4. The computer based multiple concurrent language catalog system of claim 1 wherein said system is divided into server and client portions.

5. The computer based multiple concurrent electronic catalog system of claim 2 wherein one locale presentation form is English another is German and a third is Japanese.

6. The computer based multiple concurrent language electronic catalog system of claim 2 wherein a semantic symbol is shared by other concept entities and translated only once.

7. The computer based multiple concurrent language electronic catalog system of claim 3 wherein one of the different forms of the same language is in an expert locale context and the other is in novice locale context.

8. The computer, based multiple concurrent language catalog system of claim 6 including multiple manipulation forms of a symbol representing the same word in a language when that word represents multiple meanings in one of said locale specific presentation forms.

9. The computer based multiple concurrent language catalog system of claim 6 including a locale specific presentation form having multiple object ID's.

10. The computer based concurrent language electronic catalog system of claim 8 including a manipulation form and the multiple different locale specific presentation forms associated with the manipulation form sharing the same object ID.

11. The computer based multiple concurrent language catalog system of claim 4 including means for negotiating a locale specific presentation form between said client and server portions.

12. In a multiple concurrent language electronic catalog computer system, the method comprising the steps of:

providing concept entities of a concept entity based hierarchical knowledge representation of symbols for the electronic catalog;

dividing concept entities of the hierarchical knowledge representation of the symbols into computer readable manipulation forms used for computer manipulation and not used for end user presentation and locale specific presentation forms with parent and child entities of the symbols hierarchically linked so that the symbols are translated once and inherited for end user presentation of concept entities in locale contexts wherein there Is a plurality of different presentation forms for different locales associated with each manipulation form and there is a different manipulation form for each different use of a symbol in a single locale;

permitting selection of one of the presentation forms for each manipulation form for presenting the concept entities in a selected locale context;

maintaining the selected one of the presentation forms separate from the associated manipulation form; and navigating through the electronic catalog using the manipulation forms of the concept entities whereby translations of the symbols are shared while semantic differences in use of the symbols are resolved.

13. The method of claim 12 including identifying the manipulation forms and the presentation forms by manipulation symbols and presentation symbols respectively; and substituting the appropriate locale presentation symbol for the associated manipulation symbol in the selected presentation form.

14. The method of claim 12 wherein said locale specific presentation forms each comprise said concept entities presented in a different language.

15. The method of claim 12 wherein one locale presentation form is English another is German and a third is Japanese.

16. The method of claim 12 wherein said locale specific presentation forms each comprise said conceptual entities presented in a different form of the same language.

17. The method of claim 16 wherein one of the different forms of the same language is in an expert locale context and the other is in novice locale context.

18. The method of claim 12 wherein a semantic symbol is used by multiple concept entities and translated only once.

19. The method of claim 12 including multiple manipulation forms of a symbol representing the same word in a language when that word represents multiple meanings in one of said locale specific presentation forms.

20. The method of claim 12, including having a manipulation form and the multiple different locale specific presentation forms associated with the manipulating form sharing the same object ID.

21. The method of claim 20 including a locale specific presentation form having multiple object ID's.

22. The method of claim 12 wherein said system is divided into server and client portions.

23. The method of claim 22 including negotiating a locale context form between said client and server portions.

24. A computer program product on a computer readable medium for a multiple electronic catalog computer system comprising:

software code for providing concept entities to a concept entity based hierarchical knowledge representation of words for the electronic catalog in a plurality of locale specific forms;

software code for dividing concept entities of the hierarchical knowledge representation into nonlocale specific, computer readable manipulation forms with different manipulation forms for different meanings of a word used for computer manipulation and storage retrieval and not for end user presentation and the locale specific presentation forms with parent and child concept entities hierarchically linked so that words are translated once and the translations inherited for presentation of concept entities in locale contexts wherein there is a plurality of different locale specific presentation forms associated with each manipulation form;

software code for permitting selection of one of the locale specific presentation forms for each of the manipulation forms for presenting the concept entities in a selected locale context;

software code for maintaining the selected one of the presentation forms separate from the associated manipulation form; and software code for providing a concept entity based on navigating through the electronic catalog using the manipulation form of the concept whereby translations of a word are shared while semantic differences in use of the word in a locale is resolved.

25. The computer program product of claim 24 wherein said locale specific presentation forms each comprise said concept entities presented in a different language.

26. The computer program product of claim 25 wherein one locale presentation form is English another is German and a third is Japanese.

27. The computer program product of claim 24 wherein said locale specific presentation forms each comprises said conceptual entities presented in different forms of the same language.

28. The computer program product of claim 27 wherein one of the different forms of the same language is in an expert locale context and the other is in novice locale context.

29. The computer program product of claim 24 wherein a word is used by other concept entities and translated only once.

30. The computer program product of claim 29 including multiple manipulation forms representing the same word in a language when that word represents multiple meanings in one of said locale specific presentation forms.

31. The computer program product of claim 29 including a manipulation form and the multiple different locale specific presentation forms associated with the manipulation form sharing the same object ID.

32. The computer program product of claim 31 including a locale specific presentation form having multiple object ID's.

33. The computer program product of claim 24 wherein said system is divided into server and client portions.

34. The computer program product of claim 33 including means for negotiating a locale context form between said client and server portions.

* * * * *